Dec. 4, 1962 W. I. CHINNICK 3,066,930
HOLDING TONGS
Filed April 20, 1959 3 Sheets-Sheet 1
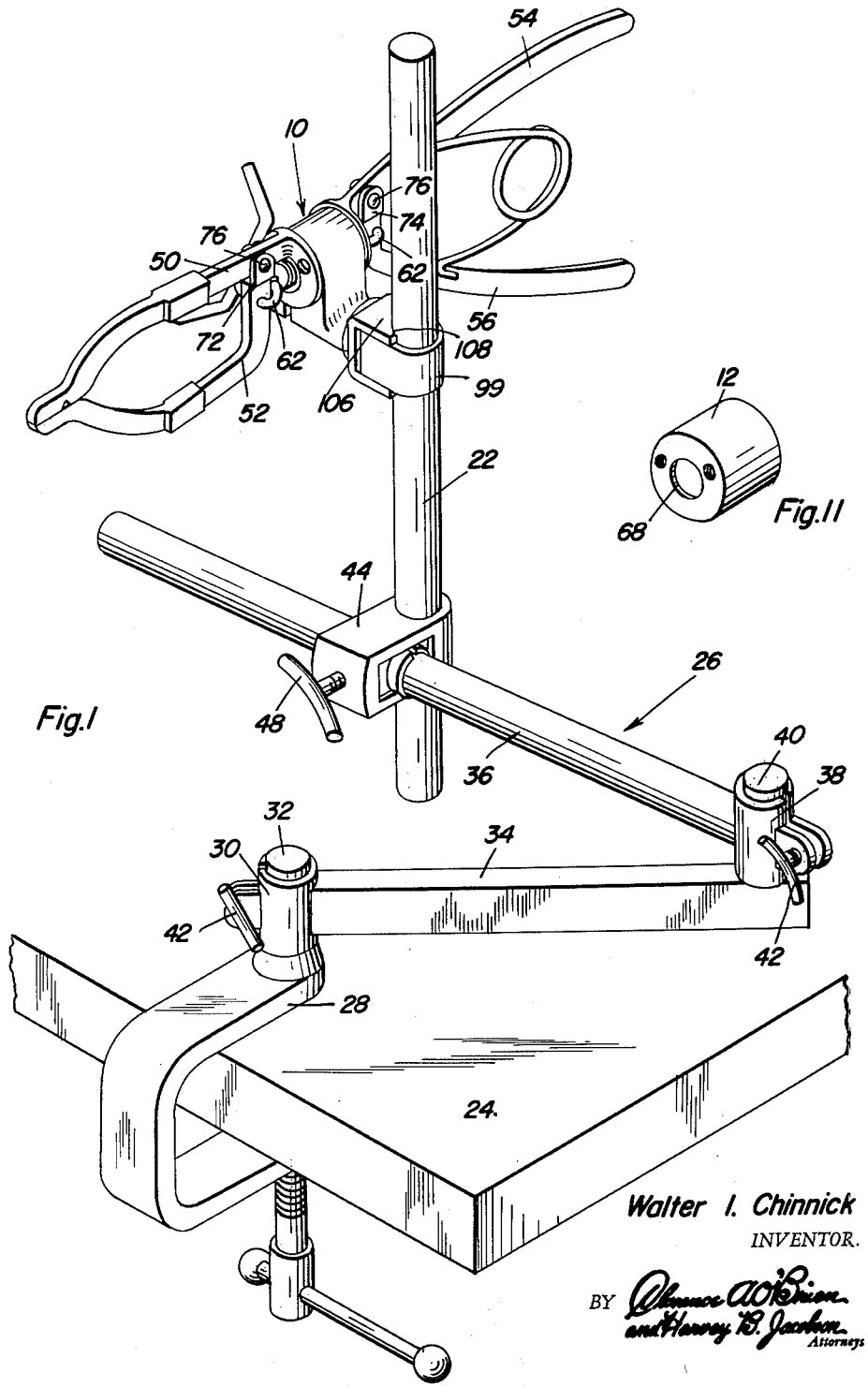
Walter I. Chinnick
INVENTOR.
BY
Attorneys Dec. 4, 1962 W. I. CHINNICK 3,066,930
HOLDING TONGS
Filed April 20, 1959 3 Sheets-Sheet 2
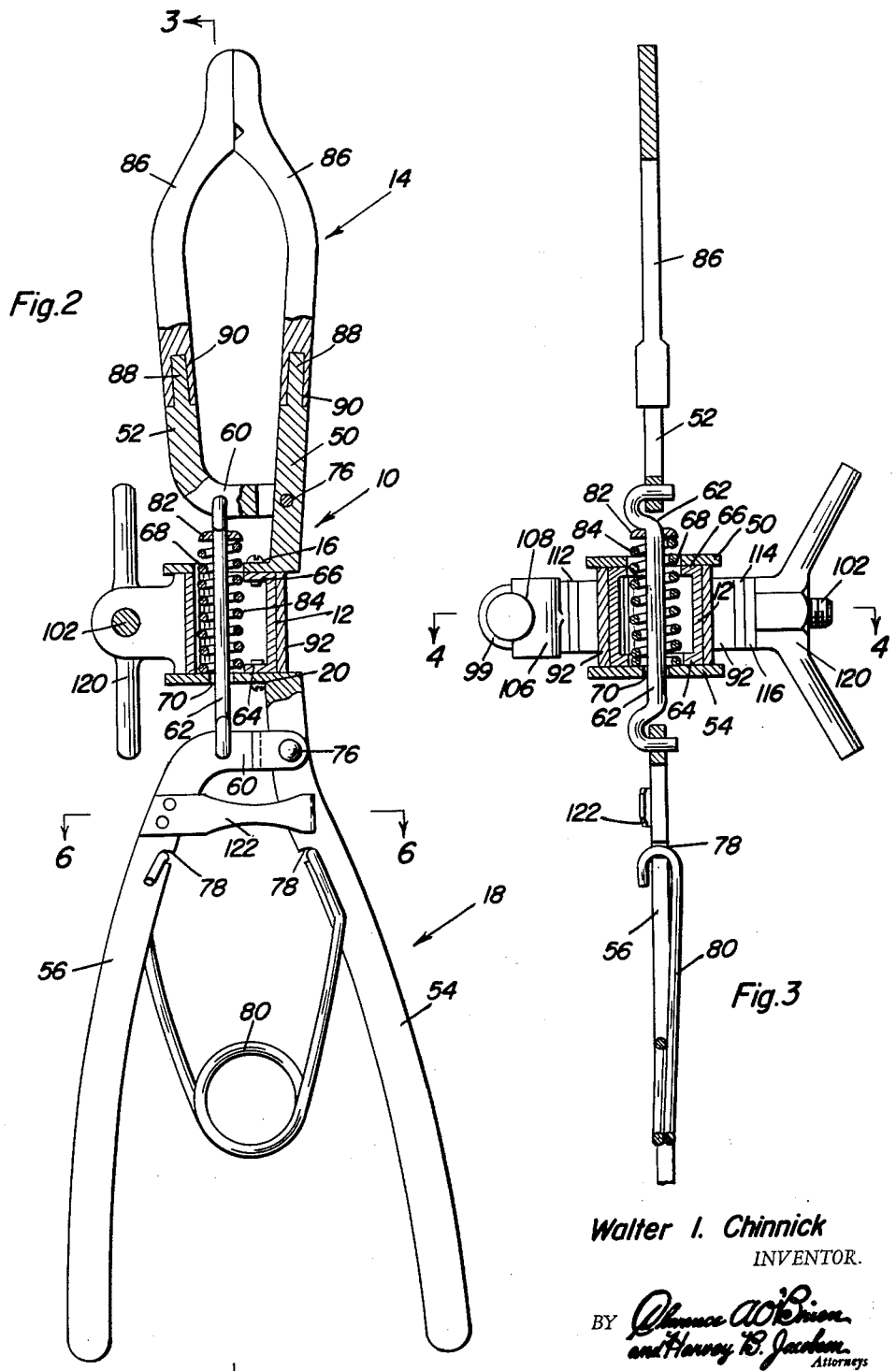
Walter I. Chinnick
INVENTOR.

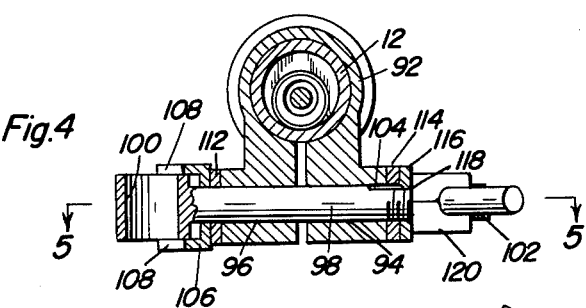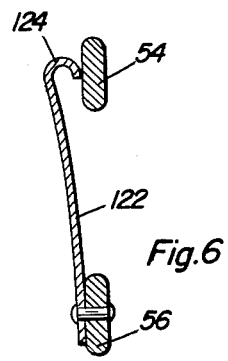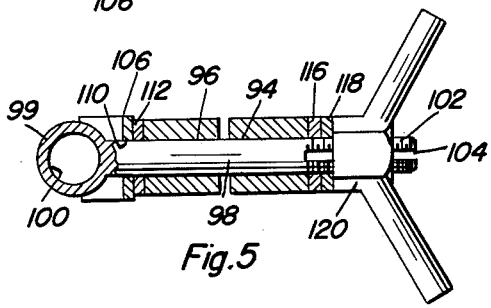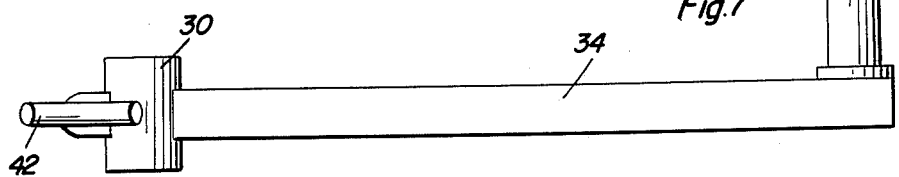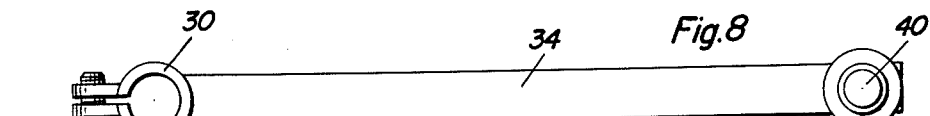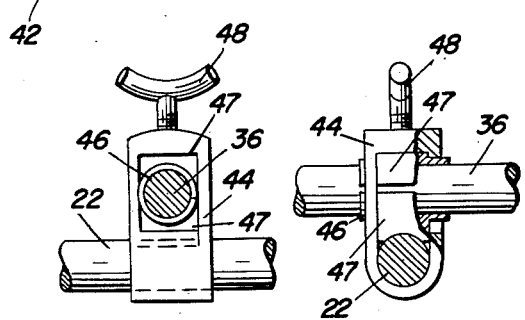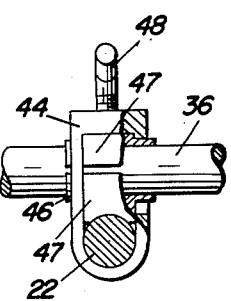
Walter I. Chinnick
INVENTOR.

United States Patent Office 3,066,930
Patented Dec. 4, 1962

3,066,930
HOLDING TONGS
Walter I. Chinnick, 340 Connecticut Ave., Trenton 9, N.J.
Filed Apr. 20, 1959, Ser. No. 807,597
8 Claims. (Cl. 269—71)

This invention relates to a new and useful holding tongs and more particularly to a vice or clamp which may be mounted on a support and pivoted about three axes.

This tool has been designed to be extremely versatile and to be used by jewelers and the like for holding small metal parts in their proper relation to each other prior to welding, brazing or silver soldering the parts together. When performing these operations it is necessary to hold the parts that are to be joined stationary and in their correct relation to each other. As can be appreciated by any person who has tried to silver solder two small parts together, unless the parts can be positioned in the correct relation to each other upon a supporting surface, it is extremely difficult to join the two parts together by welding, brazing, or silver soldering since two hands are needed to manipulate the torch and the metal being used.

The main object of this invention is to provide a tool for holding small parts in any position so that they may be secured to each other conveniently by brazing or by silver soldering.

A further object of this invention is to provide holding tongs having removable jaw elements so that jaws of proper shape may be furnished for holding any specific part.

Another object, in accordance with the preceding object, is to provide a holding tongs whose jaws are normally urged towards a closed position.

A still further object, in accordance with the preceding objects, is to provide a holding tongs whose jaws may be retained in an open position.

A still further object of this invention, in accordance with the preceding objects, is to provide means whereby a pair of holding tongs may be universally mounted upon a stationary support for movement about three axes with a single adjusting means for frictionally retaining the holding tongs in any rotationally adjusted position about the three axes and with at least one of the axes disposed at right angles to each of the other axes at all times.

A final object to be specifically enumerated herein is to provide a pair of holding tongs that will lend themselves to conventional forms of manufacture and be of simple construction so that it may be constructed to be made readily available to the public, easy to operate, have numerous uses, and be of durable construction so that it will not require more than reasonable care to keep it in working condition at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the holding tongs shown mounted upon an adjustable support;

FIGURE 2 is a side elevational view of the holding tongs with parts being broken away and showing in section certain constructional details thereof;

FIGURE 3 is a longitudinal vertical sectional view of the invention taken substantially upon the plane indicated by the section line 3—3 of FIGURE 2;

FIGURE 4 is a horizontal transverse sectional view of the adjustable mounting means of the invention taken substantially upon the plane indicated by the section line 4—4 of FIGURE 3;

FIGURE 5 is a longitudinal horizontal sectional view taken substantially upon the plane indicated by the section line 5—5 of FIGURE 4;

FIGURE 6 is a transverse horizontal sectional view taken through the handles of the tongs substantially upon the plane indicated by the section line 6—6 of FIGURE 2;

FIGURE 7 is a side elevational view of one of the arm members of the movable support element shown in FIGURE 1;

FIGURE 8 is a top plan view of the arm of the movable support element shown in FIGURE 7;

FIGURE 9 is a fragmentary side elevational view of one of the pivotal connections of the support element;

FIGURE 10 is a fragmentary end elevational view of the pivotal connection of the support element of FIGURE 9, and;

FIGURE 11 is an enlarged perspective view of the body of the holding tongs to which the jaw and handle assemblies are secured.

Referring now more specifically to the drawings the numeral 10 generally designates the holding tongs comprising the present invention. The holding tongs 10 comprises a cylindrical hollow body 12 with a jaw assembly 14 removably secured to one end of the body by means of fasteners 16 and a handle assembly generally referred to by the reference numeral 18 removably secured to the other end of the body by means of fasteners 20, see FIGURE 2.

With attention now drawn to FIGURE 1 of the drawings it will be noted that the holding tongs 10 is secured to an upright support 22 that is mounted upon a work surface 24 by means of a pivotal arm assembly 26 and a clamp 28. The arm assembly 26 is pivotally secured at one end to a mounting clamp 28 by means of a split clamp 30 comprising a split sleeve rigidly carried by the arm 34 and which receives therethrough an upstanding cylindrical rod 32 that is rigidly carried by the clamp 28. The arm assembly 26 comprises a first arm 34, see FIGURES 7 and 8, and a second arm 36, the two being pivotally secured together by means of a split clamp 38 carried by the arm 36 and which encircles the upstanding cylindrical rod 40 fixedly secured to one end of arm 34. Split clamps 30 and 38 are each provided with an adjustment screw 42 which may be tightened to maintain each of the split clamps in adjusted position upon their respective upstanding cylindrical rods.

Secured about the arm 36 which is circular in cross-section, see also FIGURES 9, 10, is a clamp element 44 having a split sleeve 46 disposed between two friction blocks 47. The upright support 22 is also received through the clamp element 44, at right angles to arm 36, and is disposed between one of the friction blocks 47 and one end of the clamp element 44. A thumb screw 48 is provided to urge the friction blocks 47 into tight engagement with the outer surface of the arm 36 and the support shaft 22. It is to be understood therefore that the clamp element 44 may be moved both longitudinally along the second arm 36 and about its circumference. Also, the clamp element 44 may be moved both longitudinally along the upright support 22 and about its circumference.

Thus it can be seen that the upright support 22 may be secured in any position above the work surface 24. Although the pivotal arm assembly 26 is the preferred construction for this purpose, any convenient means may be used and it is to be understood that the particular means utilized for holding the upright support 22 in adjusted position is not part of the present invention.

With attention now drawn to FIGURES 2 and 3 of the drawings, it will be seen that the jaw assembly 14 comprises a pair of jaw elements 50 and 52. The one jaw element 50 is removably secured to the body 12 while the other jaw element 52 is pivotally secured by any convenient means to jaw element 50.

The handle assembly 18 comprises a pair of handle elements 54 and 56, the one handle element 54 being removably secured to the body 12 by means of fasteners 20, and the other element 56 being pivotally secured to handle element 54 by any convenient means. It will be noted that the pivoted elements 52 and 56 each have an end portion 60 which is substantially perpendicular to the corresponding elements 50 and 52. The end portions 60 are substantially parallel and it is to be noted that when the jaw assembly 14 is opened or closed that opposite movement is effected upon the handle assembly 18.

Secured between the end portions 60 is an actuating link 62. Actuating link 62 therefore, upon the movement of the jaw elements to and from each other, will effect the opposite movement of the elements 54 and 56 to and away from each other.

The body 12 is in the form of a cylindrical member having end walls 64 and 66 which are suitably apertured as at 68 and 70 to receive therethrough the actuating link 62.

With attention now drawn to FIGURE 1 it will be noted that the pivoted ends of the elements 52 and 56 are bifurcated as at 72 and 74, the bifurcations and the elements 50 and 54 being suitably apertured and having pivot pins 76 secured therethrough.

The inner surfaces of handle elements 54 and 56 are each provided with a notch 78 and a tension spring 80 is positioned between the handle elements 54 and 56 with one end of the spring 80 received in each of the notches 78 to urge the handle elements 54 and 56 away from each other. Also, secured about the actuating link 62 adjacent the jaw element 52 is a retaining member 82 which has one end of a compression spring 84 abutting thereagainst, the other end of the compression spring 84 abutting against the handle element 54 to further urge the handle element 56 away from the handle element 54. It will be noted that the aperture 68 is larger than the aperture 70, the larger allowing one end of the compression spring 84 to pass therethrough, the smaller receiving therethrough the link 62 but providing an abutment wall for the corresponding end of the spring 84.

Each of the jaw elements 50 and 52 is provided with a removable end portion 86, the end portions 86 being each of any suitable shape to facilitate the holding of an object of any particular shape therebetween. Each of the jaw elements 50 and 52 is provided with a male projection 88 which is frictionally and slidingly engaged within a complementary recess 90 formed in the adjoining ends of each of the removable end portions 86.

Surrounding the body 12 is a housing 92 which is in the form of a split clamp, the ends of which are provided with aligned apertures 94 and 96. Received through aligned apertures 94 and 96 is the shank of an eye-bolt 98, one end of the eye-bolt 98 being provided with an opening 100, and the other end of the eye-bolt having a threaded shank 102 with a flat portion 104 thereon, the purpose of which is to be hereinafter set forth. The head 99 of the eye-bolt 98 is received within the bracket or thimble 106, the sides of which are provided with aligned semicircular recesses 108 which cooperate with the opening 100 to form a circular opening in which is slidingly received the upright support 22. The thimble 106 is provided with an aperture 110 which receives therethrough the shank 102 of the eye-bolt 98. Disposed between the thimble 106 and the aperture end of the housing 92 is a friction washer 112. Encircled about the threaded portion of the shank 102 is a second friction washer 114 one side thereof abutting against the housing 92 and the other side having a retaining washer 116 abutting thereagainst having a projection 118 cooperating with the flat portion 104 of the threaded portion 102 to prevent the retaining washer from rotating about the threaded shank 102, see FIGURE 4. Threadedly engaged on the threaded shank 102 is adjusting nut 120 which is used to urge the ends of the housing 92 together to frictionally retain the body 12 in adjusted rotated positions therein. Also, as the nut 120 is tightened on the eye-bolt 98 the friction washer 112 will retain the eye-bolt 98 in adjusted rotated position through the apertured ends of the split-ring type housing 92. Further, as the nut 120 is tightened, the head 99 of the eye-bolt 98 is drawn within the thimble 106 causing the semi-circular recess 108 to cooperate with opening 100 to frictionally engage the outer surfaces of the upright support 22 and frictionally retain the head 99 of the bolt 98 in adjusted vertical and rotated positions thereon.

Therefore, as the nut 120 is tightened upon the threaded shank portion 102 of the eye-bolt 98, the frictional engagement, between the eye-bolt 98 and the ends of the housing 92, between the body 12 and the housing 92, and between the head 99 of the eye-bolt 98 and the upright support 22 are all increased. Therefore, with the nut 120 applying only a slight pressure, the body 12 of the holding tongs 10 may be rotated about its longitudinal axis within the housing 92, the housing 92 may be rotated about the longitudinal axis of the eye-bolt 98, and the head 99 of the eye-bolt 98 may be rotated about the cylindrical upright support 22. Thus, the holding tongs 10 may be rotatably positioned about the three axes of rotation. As the nut 120 is tightened upon the threaded shank 102 all of the pivotal connections are simultaneously caused to grippingly retain the holding tongs 10 in its adjusted position.

In operation, the handle elements 54 and 56 may be moved together to open the jaw elements 50 and 52 until an object has been placed therebetween whereupon the handle elements may be released, the coil spring 80 and the compression spring 84 then moving the jaw elements 50 and 52 to a closed position about the article disposed therebetween.

Although there have been two different springs 80 and 84 shown in the drawings, it is to be understood that in some instances only one of the springs is needed and that the other may be omitted. The springs are utilized to yieldingly urge the jaw elements 50 and 52 toward the closed position.

With reference to FIGURES 2 and 6, it will be noted that there is secured to handle element 56 one end of a spring clip 122 the other end of spring clip 122 being provided with a hook 124 which is adapted to engage the handle element 54 when handle element 56 is pivoted theretowards to retain the jaw elements 50 and 52 in spaced relation. The spring clip 122, see FIGURE 6 in particular, has its free end laterally offset so as to render it ineffective unless lateral pressure is brought to bear urging it towards the handle element 54 whereupon it will engage and retain handle element 56 in pivoted position towards handle element 54.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holding tongs assembly comprising an elongated body, a jaw assembly supported by one end of said body, said jaw assembly including a pair of elongated jaw elements having free ends movable toward and away from each other, jaw actuating means for movement of said jaw elements relative to each other secured to the other end of said body, connecting means operatively connecting said jaw assembly and said jaw actuating means, means disposed between said jaw assembly and said actuating means for pivotally mounting said body from a support, said jaw actuating means comprising a handle assembly having a pair of handle elements movable to and from each other, one of said jaw elements and one of said handle elements being removably secured to opposite ends of said body, the other jaw and handle elements being pivotally secured to said one jaw and handle elements respectively, a portion of said other jaw and handle element being movable towards and away from each other upon pivotal movement of either, said connecting means comprising a rigid link secured between said portions whereby movement of said other handle element towards said one handle element will effect movement of said other jaw element away from said one jaw element.

2. The combination of claim 1 including means normally urging said jaw elements towards each other.

3. The combination of claim 2 wherein said urging means includes a spring secured between said handle elements urging them away from each other.

4. The combination of claim 3 including retaining means comprising a spring clip carried by one of said handle elements and engageable with the other handle element for retaining said handle elements against movement away from each other.

5. A holding tongs assembly comprising an elongated body, a jaw assembly including an elongated fixed jaw element having one end rigidly secured to one end of said body and an elongated movable jaw element generally paralleling said first jaw element and having one end pivotally secured to one end of said fixed jaw element for movement about an axis extending transversely of said jaw elements, jaw actuating means including an elongated fixed handle element rigidly secured to the other end of said body and an elongated movable handle element generally paralleling said fixed handle element and having one end pivotally secured to said one end of said fixed handle element for movement about an axis extending transversely of said handle elements, link means extending longitudinally through said body and operatively connecting said movable handle and jaw elements for movement of the latter relative to said fixed jaw element in response to movement of said movable handle element relative to said fixed handle element.

6. The combination of claim 5 including mounting means engaged with said body and adapted to support said assembly from a support.

7. The combination of claim 6 wherein said mounting means includes means journaling said body for rotation about its longitudinal axis.

8. The combination of claim 7 wherein said mounting means also includes means for frictionally retaining said body in a selected rotated position relative to said mounting means.

References Cited in the file of this patent

UNITED STATES PATENTS

| | | |
|---|---|---|
| 1,615,889 | Senn | Feb. 1, 1927 |
| 1,680,560 | McDonald | Aug. 14, 1928 |
| 1,933,718 | Devincenzi | Nov. 7, 1933 |
| 2,019,789 | Mahannah | Nov. 5, 1935 |
| 2,456,003 | Knutson | Dec. 14, 1948 |
| 2,551,401 | Underhill | May 1, 1951 |
| 2,586,636 | Fischer | Feb. 19, 1952 |
| 2,614,894 | Brock | Oct. 21, 1952 |